United States Patent [19]

Wanner et al.

[11] 3,889,491

[45] June 17, 1975

[54] TORQUE-TRANSMITTING SAFETY COUPLING

[75] Inventors: Karl Wanner, Echterdingen; Hubertus Karl, Bernhausen; Gernot Hänsel, Stuttgart-Plieningen; Manfred Bleicher, Leinfelden; Wolfgang Schmid, Plattenhardt, all of Germany

[73] Assignee: Robert Bosch G.m.b.H., Stuttgart, Germany

[22] Filed: June 26, 1973

[21] Appl. No.: 373,666

[30] Foreign Application Priority Data
July 6, 1972   Germany............................ 2233130

[52] U.S. Cl..................................... 64/29; 64/30 R
[51] Int. Cl............................................. F16d 3/56
[58] Field of Search..................... 64/29, 30 E, 30 R

[56] References Cited
UNITED STATES PATENTS
1,911,507   5/1933   Hitchcock............................. 64/29

1,913,046   6/1933   Callan.................................... 64/29
2,960,852   11/1960   Schröter et al. ....................... 64/29
3,722,644   3/1973   Steinhagen............................ 64/29

FOREIGN PATENTS OR APPLICATIONS
1,112,351   8/1961   Germany............................... 64/27

*Primary Examiner*—Samuel Scott
*Assistant Examiner*—Randall Heald
*Attorney, Agent, or Firm*—Michael S. Striker

[57] ABSTRACT

A driven coupling component and a driving coupling component are provided with cooperating coupling portions which are so configured as to be engageable with one another in only one relative angular position of the components, and to be disengageable in response to the torque transmitted between the components exceeding a predetermined level. A biasing arrangement acts upon the components and urges the coupling portions into engagement.

13 Claims, 10 Drawing Figures

TORQUE-TRANSMITTING SAFETY COUPLING

BACKGROUND OF THE INVENTION

The present invention relates generally to a coupling, and more particularly to a safety coupling. Still more particularly, the invention relates to a torque-transmitting safety coupling.

Torque-transmitting safety couplings having a driven and a driving coupling component are already known. They have coupling portions which interengage with one another and which, under the influence of an appropriate biasing force, remain in engagement until a certain level of torque is exceeded at which they disengage against the action of the biasing means. Generally speaking the prior art constructions have surfaces which can abut and transmit in circumferential direction of the components — that is in the direction of rotation thereof — a torque. When a torque is transmitted they transfer a resulting force in direction normal to the circumferential direction and this force is compensated by the biasing spring or analogous device until maximum torque has been reached, at which time the coupling disengages in that it overcomes the biasing action of the spring. The surfaces via which torque is transmitted are made as large as is possible within the space limitations existing for the particular coupling, in order to keep the wear low. This is usually achieved in that a large number of portions are provided at the circumference of the coupling components. In the known constructions these coupling portions are always of identical configuration and are symmetrically distributed around the circumference of the respective components so that the driving and the driven component can be coupled with one another is almost any relative angular relationship.

However, this prior art has the disadvantage that if the maximum selected torque is exceeded and the coupling tends to disengage, it will also briefly reengage per revolution by a number of times corresponding to the number of pairs of coupling portions. In other words, the coupling portions of one component will slide over and briefly snap between the coupling portions of the other component before they become again disengaged. The result of this is, of course, that high wear is experienced and that furthermore the drive motor is subjected to considerable strain.

Another prior-art construction utilizes only a single pair of coupling portions which engage only once per revolution of the components. While this quite evidently reduces the strain exerted upon the drive motor, the circumferentially facing contact faces through which the torque must be transmitted have to be made very large in order to avoid premature wear. For this reason, this latter prior art construction is of very considerable size and there are many applications where its size makes it impossible to employ this construction.

SUMMARY OF THE INVENTION

It is, accordingly, an object of the present invention to provide an improved torque-transmitting safety coupling which overcomes the disadvantages of the prior art.

More particularly, it is an object of the invention to provide such a coupling which is subject to only a minimum amount of wear.

An additional object of the invention is to provide such a coupling which is of small dimensions.

A further object of the invention is to provide a coupling of the type in question which causes only little strain on the drive motor when the coupling becomes disengaged as a safety measure upon exceeding of the preset torque limit.

In keeping with these objects and others which will become apparent hereafter, one feature of the inventon resides in a torque-transmitting safety coupling which, briefly stated, comprises a driven coupling component and a driving coupling component. Cooperating coupling portions are provided on these components and are so configurated as to be engageable with one another in only one relative angular position of said components, and to be disengageable in response to the torque transmitted between said components exceeding a predetermined level. Biasing means acts upon the components and urges the coupling portions into engagement.

With this construction the coupling portions of the two components can engage with one another in only one relative angular position of the components, that is only once during each revolution of one component relative to the other. Evidently, this results in a substantial reduction in the stress which is placed upon the drive motor and if, for instance, the coupling is used in a hand held hammer drill or the like, the operator — who must counteract the torque when the coupling disengages — need do so only once per revolution.

It is advantageous if the coupling portions form pairs of coupling portions, that is one coupling portion from each component, which are arranged at irregular angular circumferential spacing on the two components, and some of which (or all of which) are of various different configurations. This has the advantage that a large number of coupling portions each having a relatively small torque-transmitting surface can be distributed over the entire circumference of the respective component and that, although the coupling has a large composite torque-transmitting surface area at small surface area pressure, it can be built to very small dimensions. The particular configuration and arrangement assure that the coupling can become reengaged only once during each revolution of one component relative to the other.

A particularly advantageous embodiment of the invention utilizes claws as coupling portions which are fast with the driving and the driven component, respectively, at the axial end faces thereof which face one another. These claws have inclined flanks and free outer ends of smaller area than their roots. In circumferential direction of the respective components the width of the claws of each cooperating pair is different, and the components can become disengaged by relative movement in axial direction.

A further embodiment of the invention proposes that the coupling portions on the driving and/or the driven component are displaceable in axial or radial direction against the force of the biasing means, but are always connected in torque-transmitting relationship with one of the components. The coupling portions may be in form of balls or spherical members which are in constant torque-transmitting relationship with one of the components and can move against the force of the biasing means with the same. The other of the components is then provided with recesses into which these spherical members can enter under the urging of the biasing means. The spherical members and the recesses have different relative spacing in circumferential direction. This construction has the advantage that in radial direction the dimension of the coupling can be very small and the coupling can be produced very inexpensively, having components subject to wear (particularly the spherical members) which can be readily replaced at low expense.

However, according to another concept of the invention the driving and driven component may be arranged coaxially and overlap coaxially, and the coupling portions may be in form of claws which are fixedly connected with the adjacent inner and outer circumferential surfaces of these components and engage with one another in screwthread manner. The pairs of claws are of different dimensions in tangential or circumferential direction. This construction has the advantage that the surfaces which transmit the maximum torque can be very large but yet the overall dimension of the coupling can be quite small. A reduction in the number of pairs of coupling portions can be compensated by correspondingly longer configuration.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
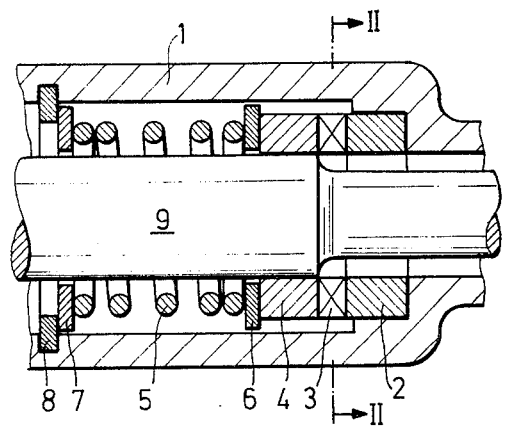
FIG. 1 is a diagrammatic fragmentary axial section, illustrating one embodiment of the invention.
Figure 2:
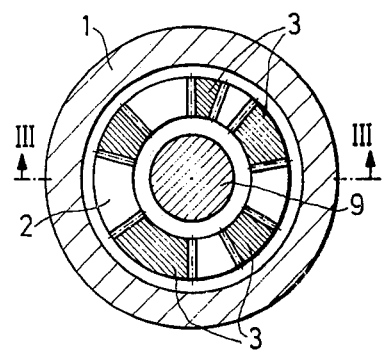
FIG. 2 is a section taken on line II—II of FIG. 1.
Figure 3:
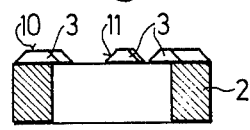
FIG. 3 is a section taken on line III—III of FIG. 2.

Discussing the drawing in detail, and referring firstly to FIGS. 1 – 3 which illustrate one embodiment of the invention, it will be seen that reference numeral 1 identifies the housing of a torque-transmitting safety coupling according to the present invention. A coupling ring 2 is accommodated in the housing and is provided at its free end face with coupling portions in form of claws 3 which engage similar claws of a coupling sleeve 4 when the latter is subjected to axial displacement under the force of a biasing spring 5 which acts upon it via an intermediate ring 6. At the opposite end the spring 5 bears upon a further intermediate ring 7 and a retaining ring 8 and ultimately upon the housing 1. The sleeve 4 is firmly and rotatably connected with a shaft 9 which transmits motion to it.

Reference to FIGS. 2 and 3 shows the configuration and arrangement of the claws 3 whose flanks 11 will be seen to be so inclined that their free outer end faces 10 are of smaller surface area than their roots. The inclination of the flanks 11 in the particular illustrated embodiment is 45°, but of course, the inclination could be larger with the understanding that this will result in a different torque level at which the coupling will become disengaged. It will be seen particularly clearly from FIG. 2 that the claws 3 are of different width in tangential or circumferential direction. The claws 3 on the sleeve 4, which claws are not illustrated in FIG. 2, are provided so as to be arranged mirror-symmetrically with reference to the claws 3 on the ring 2.

When a certain predetermined torque level as been exceeded the claws 3 of the components 2 and 4 become disengaged. When this takes place, the components 2 and 4 must turn through 360° relative to one another before the claws 3 can reengage. This is assured by the different angular spacing of the claws 3 in circumferential direction on the two components 2 and 4 and also by the different width of the claws. With this construction the high torque moment which is required for the motor to disengage the claws again, will occur only once during each revolution and thus the stresses upon the motor (and upon an operator who may be holding a device provided with such a coupling) are substantially reduced. Because of the large torque-transmitting surfaces on the flanks 11, the surface area pressure and thereby the wear on these surfaces is drastically reduced.

Figure 4:
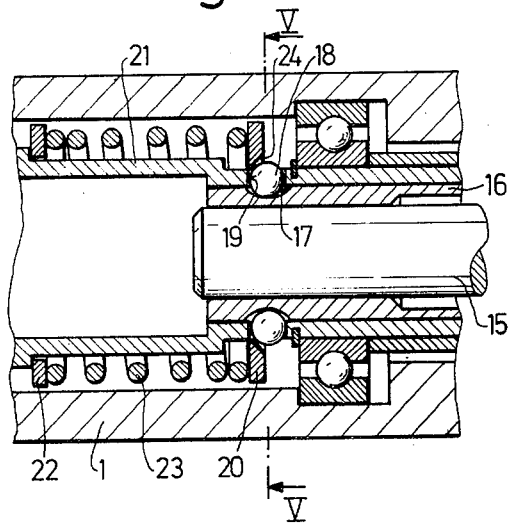
FIG. 4 is a view similar to FIG. 1 but illustrating a further embodiment of the invention.
Figure 5:
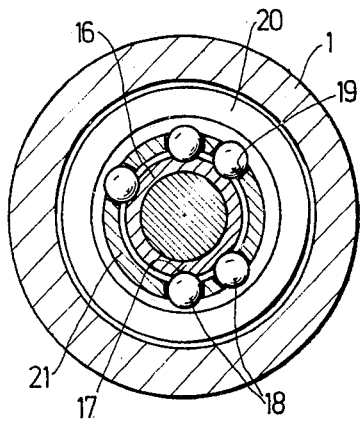
FIG. 5 is a section taken on line V—V of FIG. 4.

In the embodiment of FIGS. 4 and 5, a coupling sleeve 16 is mounted on a shaft 15 for rotation therewith. It is provided on its outer circumferential surface with a plurality of recesses 17 which are arranged at irregular angular spacing about the circumference. Balls 18, which are guided in bores 19, are pressed into these recesses by a ring 20. The number of bores and their arrangement corresponds to that of the recesses 17 provided in a sleeve 21 which overlaps the sleeve 16 and which is biased via an intermediate ring 22 by a spring 23. The ring 20 is provided with a bevel portion 24 where it contacts the balls 18.

In this arrangement a torque will be transmitted by the sleeve 21 as long as the balls 18 are pressed by the ring 20 into the recesses 17. Under these conditions a torque-transmitting connection is established via the sleeve 21, the bores 19, the balls 18, the sleeve 16 and the shaft 15. When the preselected maximum torque level is exceeded, then the resulting forces which tend to urge the balls 18 out of the recesses 17 become greater than the force which acts in radial direction upon the balls 18 from the spring 23 via the ring 20. In this case the balls 18 move radially outwardly and subsequently can snap back into the recesses 17 only after the sleeve 16 and 21 have performed a relative rotational movement through 360°.

The recesses 17 may be in form of elongated grooves, with the cross-section of the groove being accommodated to the spherical shape of the balls 18. The flatter these grooves are, the less the torque which can be transmitted will be, given the same biasing force. The maximum torque that can be transmitted can, however, also be influenced by the size of the balls 18. Of course it will be appreciated that, instead of grooves, the recesses 17 can simply be in form of depressions, and that the recesses could be provided directly on the shaft 15 instead of on the sleeve 16 which could in that case be omitted.

Figure 6:
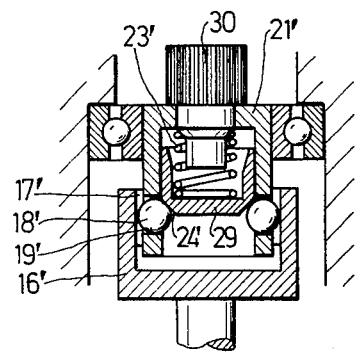
FIG. 6 is a view analogous to FIG. 4 but illustrating an additional embodiment of the invention.

FIG. 6 shows a further embodiment of the invention which is somewhat analogous to that in FIGS. 4 and 5. Here, the balls 18' are guided in bores 19' which are formed at irregular angular spacing in the sleeve 21'. They are forced into the recesses 17' of the sleeve 16'. Sleeve 21' will be seen to be substantially cup-shaped in configuration and is fixedly connected with a pinion 30. The cup member 29 is located within the sleeve 21' and is pressed by a spring 23' against the balls 18' which are contacted by a beveled surface 24'. The balls are pushed radially outwardly, and the recesses 17' are here configurated as internal grooves of a cross-section corresponding to a segment of a circle.

Both of the embodiments of FIGS. 4 and 6 have the advantage that in radial direction their dimension is very small, and also that they are very simply and inexpensively produced. Moreover, parts which are subject to wear, such as the balls, can be readily and inexpensively replaced, aside from the fact that these balls due to their spherical configuration do not tend towards substantial wear in the first place.

Figure 7:
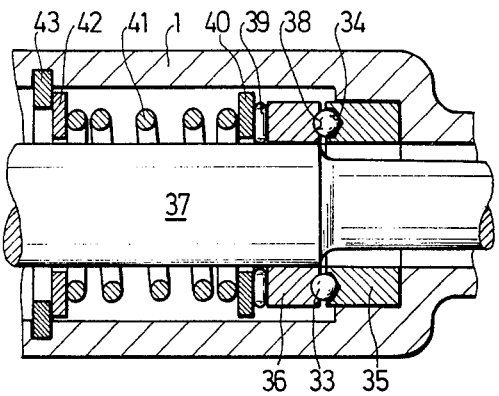
FIG. 7 is a view analogous to FIG. 4 but illustrating still a further embodiment of the invention.
Figure 8:
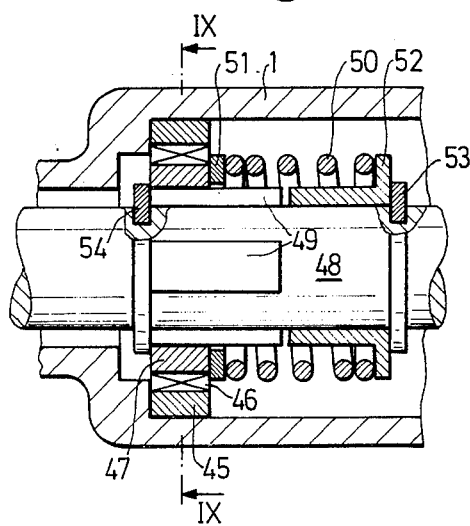
FIG. 8 is a view similar to FIG. 7, illustrating a further embodiment of the invention.
Figure 9:
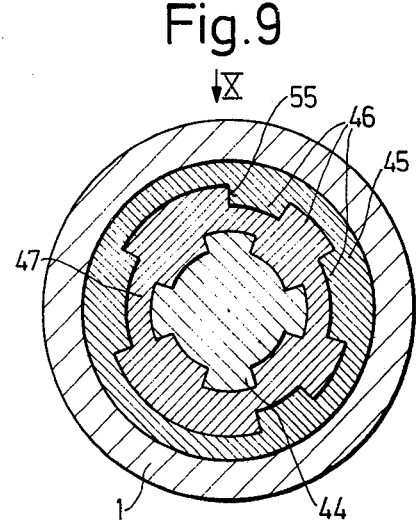
FIG. 9 is a section taken on line IX—IX of FIG. 8.
Figure 10:
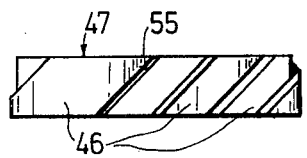
FIG. 10 is a plan view of FIG. 9, as seen in the direction of the arrow X of that Figure.

The embodiment in FIG. 7 is reminiscent of that in FIG. 1. In the embodiment of FIG. 7, however, the claws 3 of FIG. 1 are replaced by spherical or ball-shaped members 33. These are received in short blind bores so that a portion of each of the balls 33 extends beyond the end face of a coupling ring 35 and is fixedly mounted in the housing 1. The balls are distributed in circumferential direction of the ring 35 and at irregular angular spacing. Their projecting portions extend into depressions or recesses 38 formed in the axial end face of a coupling ring 36 which is fixedly connected with a shaft 37 and which is biased towards the ring 35 in axial direction by a spring 41 via a needle bearing 39 of an intermediate ring 40. The spring 41 bears against the housing 1 via a further intermediate ring 42 and a retaining ring 43.

In this construction, when a maximum torque to be transmitted is exceeded, the ring 36 and the shaft 37 are displaced by the resulting forces against the force of the biasing spring 41 in axial direction and away from the ring 35. Reengagement can take place only after the two rings have performed a complete revolution relative to one another. It need not be emphasized that the recesses 38 may again be either depressions or radially extending grooves. This particular embodiment has the virtue that the wear of the balls is low and that the balls can be readily and inexpensively replaced when they have been worn beyond further use.

The embodiment in FIGS. 8 – 19, finally, utilizes an outer coupling ring 45 which is press-fitted in a housing 1. The inner circumferential surface of the ring 45 is provided with helically configurated claws 46 of different width and different angular spacing. These claws 46 mesh with corresponding claws 46 of an inner coupling ring 47 on the outer circumferential surface of which latter they are formed. The inner coupling ring 47 is axially shiftable, being mounted on a shaft 48. A key 49 serves to connect the inner ring 47 with the shaft 48 so that it can rotate with the same. A spring 50 acts via an intermediate ring 51 upon the inner coupling ring 47 in axial direction, and bears at its other end via a sleeve-shaped spring disc 52 and a retaining ring 53 against the shaft 48. The position of the inner coupling ring 47, in which the coupling claws thereof engage over their entire length with the coupling claws of the outer ring 45, is determined by a retaining ring 54 provided on the shaft 58.

When in this embodiment the maximum permitted torque is exceeded, the inner coupling member 47 shifts axially against the biasing force of the spring 50, in accordance with the screw-turning movement of the claws 46 relative to one another. After a displacement has taken place corresponding to the entire axial length of the coupling ring, the latter becomes disengaged from the outer coupling ring 45, and can now turn with the shaft 48 through 360° before it can become reengaged, that is before its claws can reengage those of the coupling ring 45. This particular embodiment has the advantage that the surfaces which transmit torque in circumferential direction and which are identified with reference numeral 55 on the claws, can be of very large area, meaning that the surface pressure and the wear of these surfaces is relatively low. The configuration of the claws 46 of the ring 47 is clearly evident from FIGS. 9 and 10.

Of course, modifications may be made in and from the exemplary embodiments which have been described herein without departing from the scope and intent of the invention. In particular, it goes without saying that the invention can be used with couplings in which the driving and the driven component rotates constantly as well as in couplings in which constant rotation does not exist.

The couplings according to the present invention are particularly well suited, although not exclusively so, for use in electromechanical tools, in particular manually held tools, such as hammer drills or the like. The use of such couplings in this type of device has the substantial advantage that the stresses which must be absorbed by the user holding the tool, will act upon the user only once during each rotation of the coupling, after the coupling has become disengaged that is after the permissible torque has been exceeded.

It will be understood that each of the elements described above, or two or more together, may also find a useful application in other types of constructions differing from the types described above.

While the invention has been illustrated and described as embodied in a torque-transmitting safety coupling, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A torque-transmitting safety coupling, comprising a driven coupling component; a driving coupling component; cooperating coupling portions on said components and so configurated as to be engageable with one another in only a single relative angular position of said components, and to be disengageable in response to the torque transmitted between said components exceeding a predetermined level; and biasing means acting upon said components and urging said coupling portions into engagement.

2. A coupling as defined in claim 1, wherein the cooperating coupling portions of said components cooperate in pairs which are arranged on said components with irregular circumferential spacing and are of different configuration.

3. A coupling as defined in claim 1, wherein the cooperating coupling portions of said components cooperate in pairs which are arranged on said components and are of different configuration.

4. A coupling as defined in claim 1, said components having axial end faces extending transversely of their axis of rotation; and wherein said portions are claws provided on said end faces and having inclined flanks and free ends which are of smaller cross-section than the respective roots, the width of the claws in circumferential direction being different in different pairs of cooperating ones of said portions.

5. A coupling as defined in claim 1, wherein said coupling portions are displaceable on at least one of said components against the action of said biasing means, but are always in torque-transmitting connection with one of said components.

6. A coupling as defined in claim 1, wherein said portions are coupling members which are in permanent torque-transmitting connection with one of said components but displaceable relative thereto against the action of said biasing means, the other of said components having recesses into which said members are urged by said biasing means, and wherein the circumferential spacing of said members differs from the circumferential spacing of said recesses.

7. A coupling as defined in claim 6, wherein said components interengage coaxially; and wherein said members are provided on the periphery of one of said components.

8. A coupling as defined in claim 6, wherein said components have respective facing axial end faces extending transversely of their axis of rotation; and wherein said members and recesses are provided on the respective axial end faces.

9. A coupling as defined in claim 6, wherein said coupling members are spherical.

10. A coupling as defined in claim 6, wherein said coupling members are cylindrical.

11. A coupling as defined in claim 1, wherein said components are arranged coaxially and overlap one another; and wherein said coupling portions are pairs of cooperating claws provided on juxtaposed inner and outer circumferential surfaces of the respective components, the claws of different pairs having different widths in circumferential direction of said components.

12. A coupling as defined in claim 1, wherein said biasing means comprises spring means.

13. A coupling as defined in claim 1, wherein said driving coupling component is an inner sleeve mountable on a shaft, and said driving coupling component is an outer sleeve in part telescoped over and turnably surrounding said inner sleeve; said coupling portions comprising a number of irregularly circumferentially spaced first recesses in said inner sleeve, a similar number of irregularly circumferentially spaced second recesses extending through said outer sleeve, and a plurality of spherical members each adapted to extend partly into one of said first recesses and partly into one of said second recesses when said sleeves are in said relative angular position; and wherein said biasing means comprises a ring surrounding said outer sleeve, and a spring also surrounding said outer sleeve and bearing upon the same and upon said ring to urge the same against said spherical members so as to prevent them from moving radially outwardly of said second recesses and thereby become retracted from said first recesses unless said torque exceeds said predetermined level.

* * * * *